(12) United States Patent
Murphy

(10) Patent No.: US 7,245,130 B2
(45) Date of Patent: Jul. 17, 2007

(54) METHOD AND APPARATUS FOR DIAGNOSING MOTOR DAMPING NETWORK INTEGRITY

(75) Inventor: Paul A. Murphy, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 152 days.

(21) Appl. No.: 11/137,955

(22) Filed: May 26, 2005

(65) Prior Publication Data

US 2006/0271336 A1 Nov. 30, 2006

(51) Int. Cl.
G01R 31/06 (2006.01)
G01R 31/34 (2006.01)
G01R 27/28 (2006.01)
(52) U.S. Cl. .................. 324/546; 324/772; 324/652
(58) Field of Classification Search ............. 324/418, 324/415, 772, 545, 546, 655, 603, 527
See application file for complete search history.

(56) References Cited

U.S. PATENT DOCUMENTS

| | | | | |
|---|---|---|---|---|
| 3,808,481 | A | * | 4/1974 | Rippel ..................... 318/139 |
| 6,035,265 | A | * | 3/2000 | Dister et al. ............... 702/183 |
| 6,194,849 | B1 | * | 2/2001 | Wilson-Jones et al. ....... 318/15 |
| 6,784,687 | B2 | * | 8/2004 | Tamura ..................... 324/772 |
| 2005/0275368 | A1 | * | 12/2005 | Sippola et al. ............. 318/800 |

* cited by examiner

*Primary Examiner*—Anjan Deb
(74) *Attorney, Agent, or Firm*—Michael D. Smith

(57) ABSTRACT

An apparatus for diagnosing motor damping network integrity, the motor damping network configured for selective short-circuiting of the windings of a motor in a motor control system. The apparatus includes a motor controller with a motor drive portion thereof electrically isolated from the windings of the motor. A resonant network is based on the windings of the motor, the damping network, and a remaining non-isolated portion of the controller. An amplifier circuit applies an excitation signal to the resonant network. A detector circuit detects a response of the resonant network based on the excitation signal. A state of the damping network is determined based on the response.

18 Claims, 3 Drawing Sheets

METHOD AND APPARATUS FOR DIAGNOSING MOTOR DAMPING NETWORK INTEGRITY

BACKGROUND

This invention relates generally to a method and apparatus for motor damping. In particular, detecting the integrity of a damping network for a motor to ensure its operation.

Direct current (DC) brushless motors are synchronous machines having a permanently magnetized rotor free to rotate within fixed stator coils. Phased alternating currents passing through the stator coils generate a magnetic field that rotates the rotor. In certain applications using DC brushless motors, such as electric power steering systems, it may be necessary to rapidly stop the rotation of the motor. In order to achieve a rapid stopping or damping, the kinetic energy of the rotating motor shaft must be quickly dissipated. One simple method of motor braking uses a mechanical brake in which friction, such as between brake pads and a rotating surface, dissipates the kinetic energy of the rotor as heat. Alternatively, dynamic braking takes advantage of the fact that a coasting DC motor acts like an electrical generator. In dynamic braking, a resistance is shunted across the stator windings, thereby allowing the energy of the coasting rotor to be converted to electrical energy and dissipated within the resistance as heat.

Electromagnetic relays are often used to provide a shorting capability for one or more stator windings of a DC brushless motor. A typical electromagnetic relay features an electromagnet which, when energized, attracts a moveable iron member to the core of the electromagnet. In turn, the moveable member may separate a moveable electrical contact from a stationary contact (or join a moveable contact to a stationary contact). An electromagnetic relay, being an electromechanical device, may be susceptible to wear and tear and hence may experience degraded performance.

In addition, arcing during the switching of the relay contacts may cause degradation in the conductive properties of the contacts through the deposition of carbon or the creation of oxides at the point where the contacts meet. Carbon deposits and oxides can increase the contact resistance and affect the damping operation of the relay, if used in such an application. Therefore, what is needed in the art is a technique that provides assurance of the operability of the damping network at low cost.

SUMMARY OF THE INVENTION

Embodiments of the invention include a method for diagnosing motor damping network integrity, the motor damping network configured for selective short-circuiting of the windings of a motor in a motor control system, the method comprising electrically isolating a motor drive portion of a motor controller from the windings of the motor; the windings of the motor, the damping network, and a remaining non-isolated portion of said controller forming a resonant network; applying an excitation signal to said resonant network; detecting a response of said resonant network based on said excitation signal; and determining a state of the damping network based on said detecting.

Embodiments of the invention include an apparatus for diagnosing motor damping network integrity, the motor damping network configured for selective short-circuiting of the windings of a motor in a motor control system, the apparatus comprising a motor controller with a motor drive portion thereof electrically isolated from the windings of the motor; a resonant network based on the windings of the motor, the damping network, and a remaining non-isolated portion of said controller; an amplifier circuit for applying an excitation signal to said resonant network; a detector circuit for detecting a response of said resonant network based on said excitation signal; and wherein a state of the damping network is determined based on said response.

Embodiments of the invention include a motor controller unit for a motor having a plurality of phase windings, the motor controller unit comprising a microprocessor; a motor damping network, the motor damping network configured for selective short-circuiting of the plurality of phase windings of the motor; a motor driver, said motor driver providing an excitation current to each of said plurality of phase windings, said motor driver circuit further electrically isolated from the windings of the motor for performing a diagnostic on a motor damping network; a resonant network based on the windings of the motor, the damping network, and a remaining non-isolated portion of said controller; an amplifier circuit for applying an excitation signal to said resonant network; a detector circuit for detecting a response of said resonant network based on said excitation signal; and wherein a state of the damping network is determined based on said response.

Embodiments of the invention include a system for diagnosing motor damping network integrity, the motor damping network configured for selective short-circuiting of the windings of a motor in a motor control system, the system comprising means for electrically isolating a motor drive portion of a motor controller from the windings of the motor; means for configuring the windings of the motor, the damping network, and a remaining non-isolated portion of said controller as a resonant network; means for applying an excitation signal to said resonant network; means for detecting a response of said resonant network based on said excitation signal; and means for determining a state of the damping network based on said detecting.

BRIEF DESCRIPTION OF THE DRAWINGS

The exemplary embodiments will now be described by way of example with reference to the accompanying drawings wherein like reference numerals designate like features in the several figures, in which.

DESCRIPTION OF AN EXEMPLARY EMBODIMENT

Figure 1:
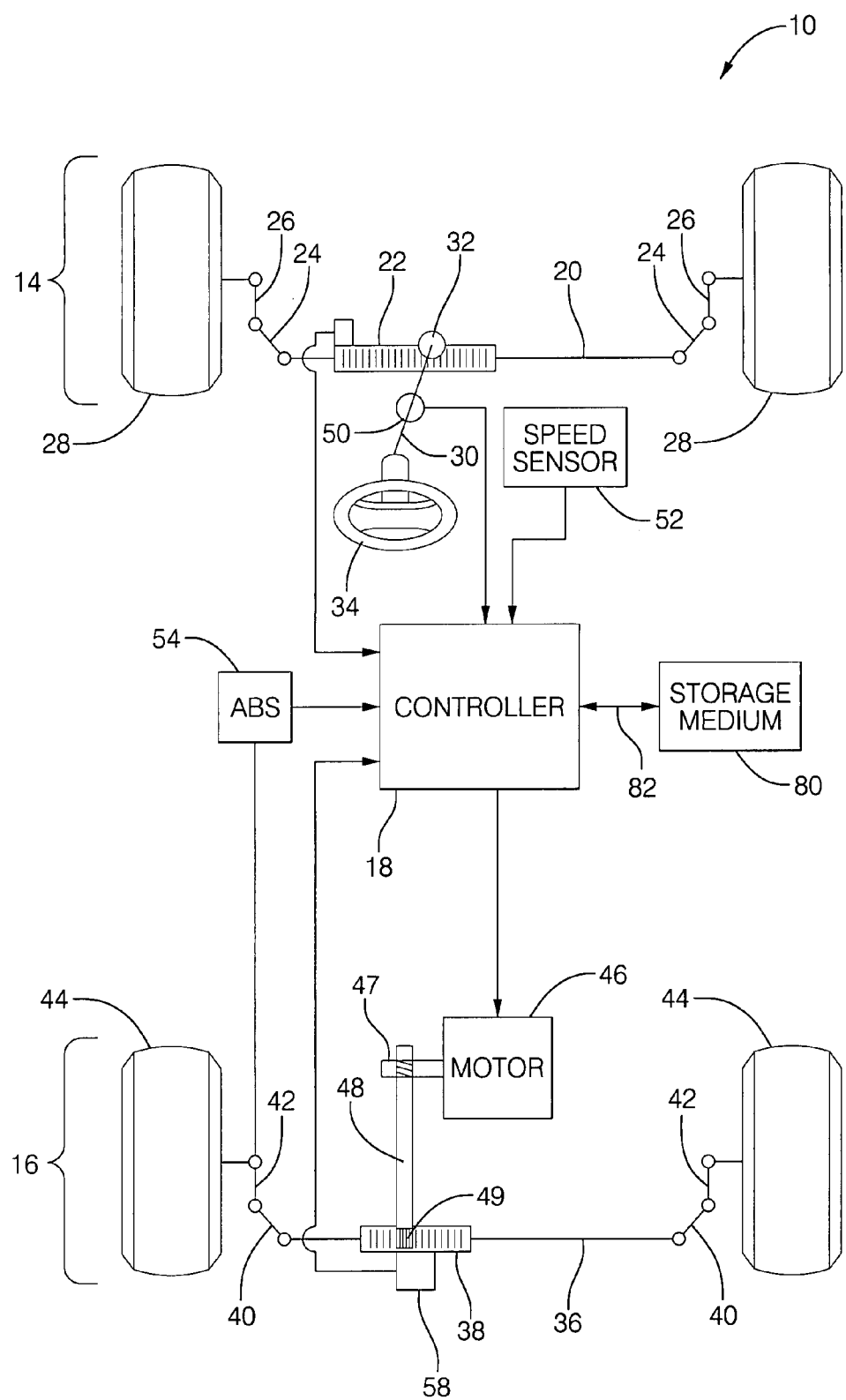
FIG. 1 is a schematic diagram of a vehicular four-wheel steering system having a controller.

In some rear-wheel steering systems a three phase brushless DC motor is employed to steer the rear wheels through a suitable gearing and linkage arrangement. This gearing includes a spring that operates to return the rear wheels to their center position whenever the system is switched from its active to its inactive state. In order to control the rate of return after this change to the inactive state, and to inhibit any subsequent movement of the wheels away from center ("self-steer"), a resistive damping network is connected across the motor terminals so as to make the motor, when inactive, act as a brake. This network generally includes three low value (e.g., 61 milliohm) resistances that are connected across the motor windings by means of a "motor-shorting" relay. When the relay contacts are closed, the three resistances form a wye network, in which each leg of the wye is connected to a respective motor phase. The relay is configured as a "normally closed" device, so that if power to the system is removed, the damping will be applied by default. On the other hand, when the relay coil is energized, the contacts are open and the resistances are removed from the circuit, thus permitting active drive and control of the motor. The motor and the shorting relay are driven by a controller module that responds to vehicle operating conditions and driver input. The motor-shorting relay and damping resistances are preferably included in the motor assembly, which means that the damping will be applied if the intervening cabling is disconnected.

When the controller is actively driving the motor, it is expected that the contacts in the motor-shorting relay will be open. If one or both sets of contacts do not open and continue conducting (for example, stuck together) when the controller is attempting active drive, an overload will result and a fault flag will be set. Conversely, when the controller is not actively driving the motor, it is expected that both sets of contacts in the motor-shorting relay will be closed. If one or both sets of contacts are not conducting, there is no, or reduced, damping and the potential for an undesirably rapid return of the rear wheels to their center position, and for subsequent undesired self-steering.

Because of these conditions, a test that verifies the conductivity of the relay contacts (and by extension the integrity of the damping network as a whole) is desired. Various means for testing the integrity of the damping network have been employed. For instance, one technique is to employ a current source and detect the current flowing. Such a technique is disclosed in commonly assigned U.S. patent application Ser. No. 10/123,437 entitled Apparatus and Method for Testing a Motor-Shorting Relay, filed Apr. 16, 2002, the contents of which are incorporated herein in their entirety.

In some applications of permanent magnet motors, a resistive damping network is connected to the motor terminals whenever the motor is not being actively supplied with power. The result is the addition of passive damping to the mechanical system that is coupled to the motor shaft. This occurs because the permanent magnet motor produces a back electromotive force, or voltage, across its terminals when its shaft is rotating; and the damping network converts this voltage into currents that in turn produce a torque that opposes the rotation.

Disclosed herein in the exemplary embodiments is a technique that obviates the need to perform any potentially error-prone measurements to evaluate the operability of a motor damping circuit. This approach uses the motor windings as part of a resonant network in an oscillator arrangement. When the damping network is not in the circuit, the remaining motor circuitry has so little damping that oscillation can be easily initiated and maintained. Conversely, when the damping network is present, the oscillation will be inhibited. In the case of a three-phase system in which a three-leg damping network is used for smooth damping torque, this approach has the advantage in that all three legs of the damping network must be intact in order for the oscillations to be suppressed. Thus, the presence of oscillation provides a clear indication that at least one part of the damping network is not functioning.

In an exemplary embodiment the oscillations are produced by a low cost amplifier arrangement that does not interfere with normal motor operation. A simple detector circuit senses the presence of the oscillation and provides the appropriate signal levels for use with microprocessor logic. Both amplifier and detector may be incorporated into the motor's existing controller electronics at only modest additional cost. Advantageously, it is noteworthy to appreciate that the impedance of the motor winding inductances at the frequency of oscillation is significantly greater than that of the relay contacts or any wiring connections, and that by utilizing a resonant condition it is possible to easily compare the impedance of the relay contacts with that of the motor inductance without having to make any direct measurements.

In an exemplary embodiment this diagnostic technique is described with reference to an automotive rear-wheel steering system that employs active control for illustrative purposes only. It should be appreciated that the invention as described herein may readily be applied to other motor control systems where damping is provided especially when employing a damping network including a shorting relay and the like.

As shown in FIG. 1, a vehicular four-wheel steering system is indicated generally by the reference numeral 10. The system 10 includes a controller 18 coupled to various sensors and interfaces for performing a variety of processes prescribed by the desired controlling functions. The system 10 is incorporable into a vehicle (not shown) to provide enhanced steering and directional control of the vehicle. The system 10 comprises a front steering mechanism, shown generally at 14, a rear steering mechanism, shown generally at 16, and a controller 18 in signal communication with the front steering mechanism 14 and the rear steering mechanism 16. Although the system 10 is described as being applicable to a rack and pinion steering arrangement, the system 10 is adaptable to other steering arrangements including, for example, integral gear steering systems.

The front steering mechanism 14 comprises a rack shaft 20, a rack 22 disposed intermediately between opposing ends of the rack shaft 20, a tie rod 24 disposed on each opposing end of the rack shaft 20, a knuckle arm 26 connected to each tie rod 24, and a front steerable wheel 28 rotatably disposed on each knuckle arm 26. The rack shaft 20, tie rods 24, and knuckle arms 26 are configured such that the front steerable wheels 28 can pivot in unison relative to the vehicle to steer or to effect a change in the direction of travel while the vehicle is moving.

The front steering mechanism 14 further comprises a mechanism through which a vehicle operator can effectuate a desired change in the direction of travel of the vehicle. Such a mechanism comprises a steering column 30 disposed in operable communication at one end with the rack 22 through a pinion 32 and at an opposing end thereof with a steering device 34. The steering device 34 may be a hand steering wheel, or "hand-wheel". Manipulation of the steering device 34, i.e., rotation of the hand-wheel, causes the axial rotation of the steering column 30, which in turn causes the rotation of the pinion 32. Rotation of the pinion 32, through the engagement of the rack 22 and the pinion 32, effectuates the lateral translation of the rack 22 relative to the vehicle. The lateral translation of the rack 22 causes the front steerable wheels 28 to change angle relative to the vehicle, thereby altering the direction of travel while the vehicle is moving.

The rear steering mechanism 16 comprises a rack shaft 36, a rack 38 disposed intermediately between opposing ends of the rack shaft 36, tie rods 40 disposed on each opposing end of the rack shaft 36, a knuckle arm 42 connected to each tie rod 40, and a rear steerable wheel 44 rotatably disposed on each knuckle arm 42. The rack shaft 36, tie rods 40, and knuckle arms 42 are configured such that rear steerable wheels 44, like the front steerable wheels 28, can be pivoted in unison relative to the vehicle to steer the vehicle upon lateral translation of the rack 38.

The rear steering mechanism 16 further comprises a mechanism through which the rear steerable wheels 44 can similarly be pivoted. Such a mechanism comprises a motor 46 operably connected to the rack 38 through a drive mechanism 48. The drive mechanism 48, through a pinion 49, transfers the rotational motion of a rotor shaft 47 of the motor 46 to linear motion of the rack 38, which effectuates the lateral motion of the rack shaft 36 and, ultimately, the pivoting of the rear steerable wheels 44.

The vehicle is further provided with a steering sensor 50 for detecting an angular position of the steering column 30 or steering device 34, a vehicle speed sensor 52, and a rear rack shaft displacement sensor 58. Vehicle speed sensor 52 includes a vehicle speed signal from the transmission and powertrain control module (PCM) (not shown), while an anti-lock brake system (ABS) generally shown at 54 connected to at least one wheel 44 also produces a vehicle speed signal relative to wheel 44. The rear rack shaft displacement sensor 58 detects the displacement of its corresponding rack shaft 36 from a reference position, which is the position in which each rear steerable wheel 44 is aligned and rotatable.

The controller 18 is disposed in signal communication with vehicular systems. The controller 18 receives informational signals from each of the systems, quantifies the received information, and provides an output command signal in response thereto, such as in this instance, for example, to the rear steering mechanism 16 through the motor 46.

In order to perform the prescribed functions and desired processing, as well as the computations therefore (e.g., the execution of the rear-wheel steering algorithms, the diagnostic methodology, and the like), the controller 18 may include, but need not be limited to, processors, computers, memory, storage, registers, timing devices, interrupts, communication interfaces, input/output signal interfaces, and the like, as well as combinations comprising at least one of the foregoing. For example, the controller 18 may include input signal filtering to enable accurate sampling and conversion or acquisition of such signals from communications interfaces.

Figure 2:
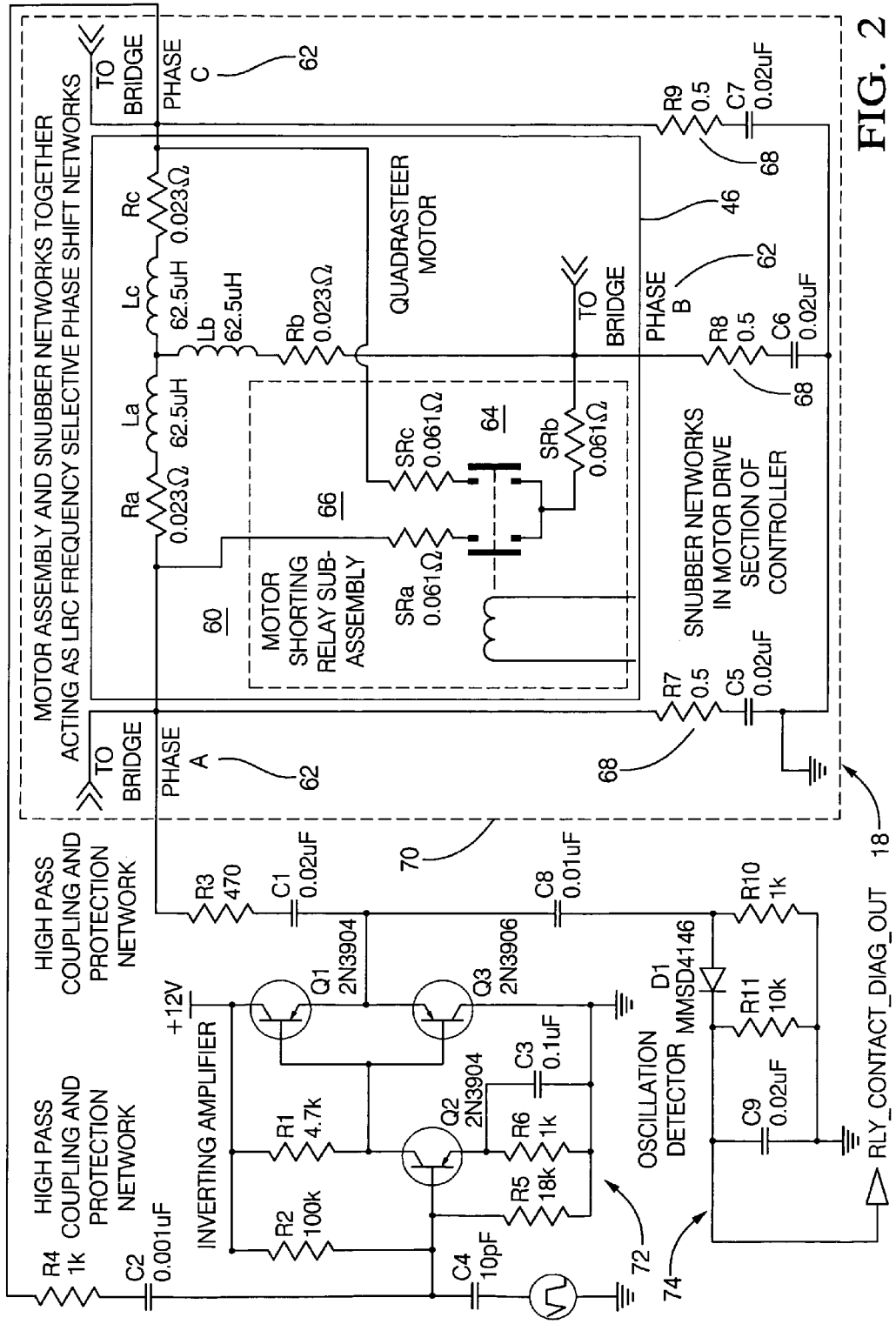
FIG. 2 is of a more detailed diagram of an exemplary embodiment.

Turning now to FIG. 2 as well, the three-phase brushless permanent magnet motor 46 is used to direct and steer the rear wheels 44. One or more springs (not shown) are included for returning the motor 46 and thereby the wheels 44 to their center position whenever the system 10 is turned off. When the system 10 is turned off or inactive (not controlled), a damping network 60 is connected to the motor terminals 62 in order to limit the speed of return and inhibit any subsequent movement of the wheels 44 away from center. In one exemplary embodiment, this connection is made through a relay 64. Each time the rear-wheel steering system 10 is turned on, the integrity of the relay contacts 66 and damping network 60 is verified before active control is allowed.

Continuing now with FIG. 2, in an exemplary embodiment the motor windings and their associated circuitry are used to form a resonant network with an oscillator that is driven by a low cost amplifier. In arriving at this methodology, it should be noted that each of the three output (motor phase) terminals (also indicated by reference numeral 62) of the controller 18 includes a resistor-capacitor network 68, commonly and hereinafter referred to as a "snubber" 68, that is employed to suppress undesirable high frequency oscillations. These high frequency oscillations arise from the inherent parasitic elements in the switching transistors (not shown) employed for pulse width modulation control and are not related to the mechanism being described herein.

The impedances of the motor windings, together with the impedances of these snubbers 68, constitute a useful wye-connected (also denoted as three-phase) inductance-capacitance-resistance (LCR) network when the controller 18 is not actively driving the motor 46. If one of the phases/legs of this wye-connected network is driven as an input and one of the remaining phases is taken as the output, the resultant is effectively a higher order low pass filter network 70 whose damping factor is a strong function of the state of the motor-shorting relay contacts 66. When this filter 70 is used as part of a feedback network with a suitable amplifier, the result is an oscillator whose behavior is detectibly sensitive to the amount of damping provided based on the state of the connections of the motor-shorting relay contacts 66. In this arrangement, one of the motor phase terminals 62 is treated as the input to the filter 70 and another terminal 62 is treated as the output. By a proper selection of two of the three motor phases, the characteristics of the filter, and thereby the state of the motor-shorting relay contacts 66 may be ascertained. For example, in an exemplary embodiment, when one or both sets of motor-shorting relay contacts 66 are open, oscillation is easily initiated and sustained, whereas when both sets of contacts 66 are closed, oscillation is inhibited. In an exemplary embodiment, phase A is chosen as the filter input and phase C is chosen for the output, because these two phases will be shorted together only when both sets of relay contacts are properly conducting. This gives the desired relationship in the diagnostic, because it is the only state in which the oscillations will be damped out.

To facilitate implementation of the diagnostic function on an exemplary embodiment additional hardware circuitry may readily be added to a controller 18 that provided the existing rear-wheel steering functionality. In an exemplary embodiment an amplifier circuit shown generally as 72 for initiating and sustaining the oscillations, and a detector circuit shown generally as 74 indicates when oscillation is taking place. When the amplifier circuit 72 is oscillating, its frequency is approximately 185 kHz. Although the amplifier circuit must provide sufficient gain (about 25) at this frequency, its other performance requirements are modest, and consequently it can be built at low cost. Likewise, the oscillation detector circuit 74 is a simple diode detector that produces a logic level output for observation and signaling. When either or both sets of relay contacts 66 are open, oscillation will take place and the output of the detector circuit 74 will assume a logic "high". Conversely, when both sets of contacts 66 are conducting, the output will be a logic "low".

Continuing with FIG. 2, in order to perform the diagnostic, power is being applied to the motor drive transistor bridge (not shown) in the controller 18, but none of the switching devices (e.g., transistors) is switched on during the time that the diagnostic is being performed. Thus, the switching devices are appropriately biased so as to present a high impedance to the phase legs of the motor 46. In this manner, the bridge is effectively isolated from the motor 46 and its impact on the filter network 70 for the purposes of the diagnostic can be ignored. Furthermore, those skilled in the art would appreciate that the capacitance of the snubbers 68 significantly exceeds that of any switching device, e.g., transistor, that is likely to be employed.

Turning now to the amplifier circuit 72 for an implementation of an exemplary embodiment, transistor Q2 provides the needed gain and phase inversion, while transistors Q1 and Q3 provide output buffering. Resistors R2, R5, R1, and R6 provide the appropriate biasing to Q2 and set the gain and quiescent output voltage to suitable levels. Finally, capacitor C3 provides emitter bypassing to support the desired midband AC gain.

Capacitor C1 and resistor R3 operate to provide isolation and protect the amplifier circuit 72 from Phase A control command voltages when the motor 46 is being actively driven. While C1 provides the necessary DC blocking, R3 is needed to limit peak currents during output switching, because C1 cannot block the transients arising from the high voltage slew rates (dV/dt) on the phase line. Similarly, resistor R4 and capacitor C2 provide similar isolation and protection at the input to the amplifier circuit 72.

In order to ensure initiation of the oscillations when the conditions warrant it, the input to the amplifier circuit 72 is also coupled to a square wave source via a small capacitance, in this example a 10 pF capacitor, C4 is utilized. It should be appreciated that the schematic depicts a 20 KHz source, however, the actual frequency is not critical.

Continuing with FIG. 2, an exemplary implementation of the oscillation detector circuit 74, is shown. To formulate a diagnostic signal, the detector circuit 74 receives the output signal from the amplifier circuit 72 and removes its DC component using the high pass filter based on capacitor C8 and resistor R10. The remaining AC component is then rectified by diode D1 and low pass filtered by resistor R11 and capacitor C9. The resultant is a DC voltage of approximately 2.8 volts when oscillation is taking place and the amplifier power supply is 12.0 volts. Conversely, when no oscillation is taking place, the output will be close to ground potential. This resultant provides the desired diagnostic signal.

Figure 3:
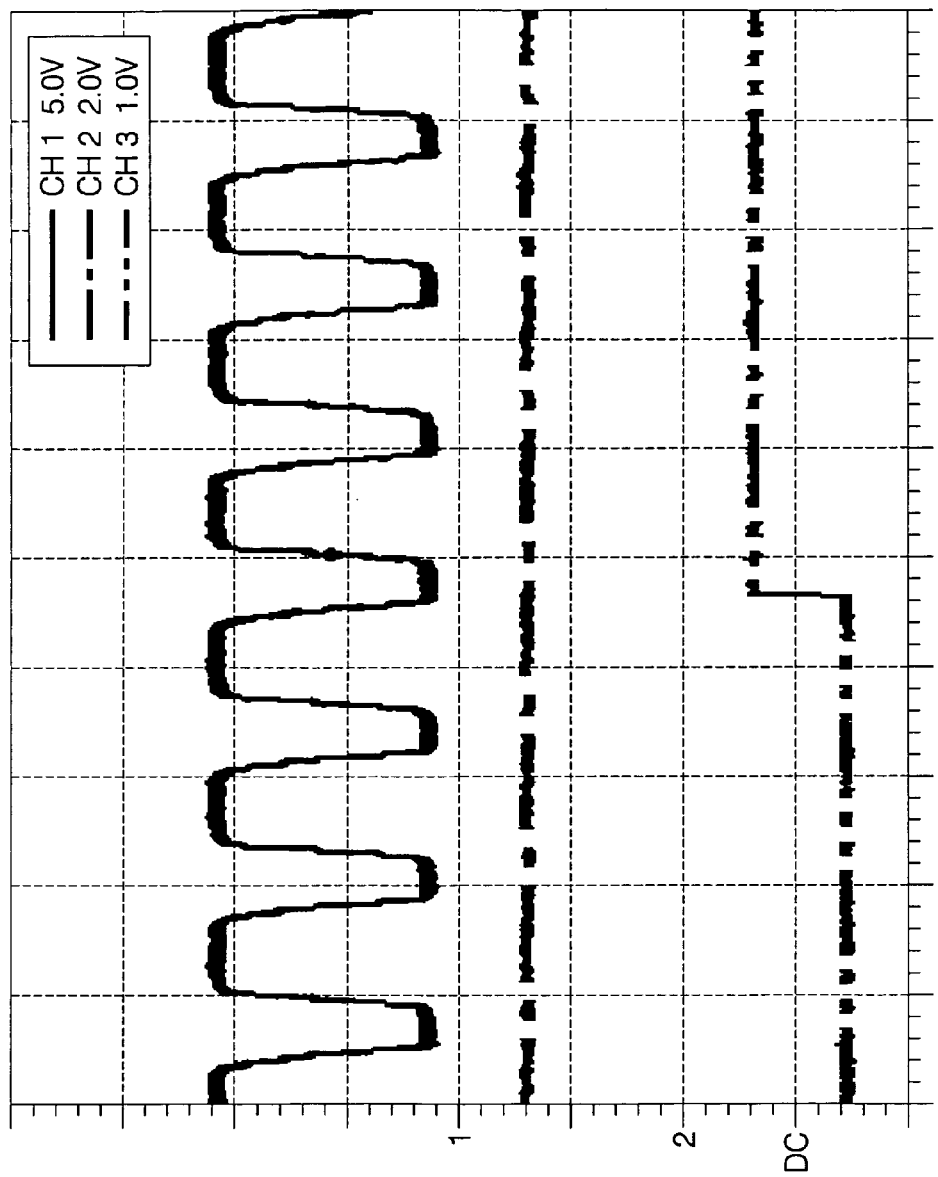
FIG. 3 is a graph depicting signals in an exemplary embodiment.

FIG. 3 is an oscillogram that shows the key signals involved in the operation of the diagnostic. For this illustration, the amplifier circuit 72 is excited with a power supply of 12 volts, and the top waveform indicates the output voltage of the amplifier circuit 72 swinging between about 1.8 and about 10.9 volts. The second waveform is the detector output, which is close to 2.8 volts. The bottom trace shows the 20 kHz square wave that is used to guarantee that the oscillator will start whenever the damping conditions permit.

When the amplifier is operated from a 12-volt supply, the detector output is suitable for use with 3.3-volt logic as the "high" value of 2.8 volts is valid high level. For other voltage supply values suitable regulation of the supply and clamping of the oscillation detector output must be provided in a practical application.

The disclosed invention can be embodied in the form of computer, controller, or processor implemented processes and apparatus for practicing those processes. The present invention can also be embodied in the form of computer program code containing instructions embodied in tangible media 80 such as floppy diskettes, CD-ROMs, hard drives, memory chips, or any other computer-readable storage medium, wherein, when the computer program code is loaded into and executed by a computer, controller, or processor 18, the computer, controller, or processor 18 becomes an apparatus for practicing the invention. The present invention may also be embodied in the form of computer program code as a data signal 82 for example, whether stored in a storage medium 80, loaded into and/or executed by a computer, controller, or processor 18 or transmitted over some transmission medium, such as over electrical wiring or cabling, through fiber optics, or via electromagnetic radiation, wherein, when the computer program code is loaded into and executed by a computer 18, the computer 18 becomes an apparatus for practicing the invention. When implemented on a general-purpose processor the computer program code segments configure the processor to create specific logic circuits.

It will be appreciated that the use of "first" and "second" or other similar nomenclature for denoting similar items is not intended to specify or imply any particular order unless otherwise specifically stated. Similarly, use of "a" or "an" shall be construed to mean "one or more" unless otherwise specifically stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for diagnosing motor damping network integrity, the motor damping network configured for selective short-circuiting of the windings of a motor in a motor control system, the method comprising:
   electrically isolating a motor drive portion of a motor controller from the windings of the motor; the windings of the motor, the damping network, and a remaining non-isolated portion of said controller forming a resonant network;
   applying an excitation signal to said resonant network;
   detecting a response of said resonant network based on said excitation signal; and
   determining a state of the damping network based on said detecting.

2. The method of claim 1 wherein said electrically isolating comprises commanding each switching device of said motor drive portion of said motor controller to a non-conducting state.

3. The method of claim 1 wherein said resonant network is an inductance capacitance resistance filter.

4. The method of claim 1 wherein phase A of the windings of the motor is chosen as the resonant network input and phase C of the windings of the motor is the resonant network output.

5. The method of claim 1 wherein said applying is based on an amplifier circuit configured to initiate and maintain oscillation via said resonant network.

6. The method of claim 5 wherein said amplifier circuit is a discrete transistor amplifier.

7. The method of claim 1 wherein said detecting a response includes:
   determining an existence of an oscillation signal indicating when an open circuit is present; and otherwise
   determining non-existence of said oscillation signal indicating a closed circuit or conduction.

8. The method of claim 1 wherein the motor damping network includes one or more sets of relay contacts and wherein existence of an oscillation signal indicates when one or more of said sets of relay contacts presents an open circuit, wherein non-existence of an oscillation signal indicates that all sets of said relay contacts are providing a closed circuit.

9. An apparatus for diagnosing motor damping network integrity, the motor damping network configured for selective short-circuiting of the windings of a motor in a motor control system, the apparatus comprising:
- a motor controller with a motor drive portion thereof electrically isolated from the windings of the motor;
- a resonant network based on the windings of the motor, the damping network, and a remaining non-isolated portion of said controller;
- an amplifier circuit for applying an excitation signal to said resonant network;
- a detector circuit for detecting a response of said resonant network based on said excitation signal; and
- wherein a state of the damping network is determined based on said response.

10. The apparatus of claim 9 wherein said motor controller is configured with each switching device of said motor drive portion commanded to a non-conducting state.

11. The apparatus of claim 9 wherein said resonant network is an inductance capacitance resistance filter.

12. The apparatus of claim 9 wherein phase A of the windings of the motor is chosen as the resonant network input and phase C of the windings of the motor is the resonant network output.

13. The apparatus of claim 9 wherein said amplifier circuit configured to initiate and maintain oscillation via said resonant network.

14. The apparatus of claim 13 wherein said amplifier circuit is a discrete transistor amplifier.

15. The apparatus of claim 9 wherein said state of the damping network is an open circuit when an oscillation signal is present; and
- otherwise, said state of the damping network is a closed circuit or conduction when said oscillation signal not present.

16. The apparatus of claim 9 wherein the motor damping network includes one or more sets of relay contacts and wherein existence of an oscillation signal indicates when one or more of said sets of relay contacts presents an open circuit, wherein non-existence of an oscillation signal indicates that all sets of said relay contacts are providing a closed circuit.

17. A motor controller unit for a motor having a plurality of phase windings, the motor controller unit comprising:
- a microprocessor;
- a motor damping network, the motor damping network configured for selective short-circuiting of the plurality of phase windings of the motor;
- a motor driver, said motor driver providing an excitation current to each of said plurality of phase windings, said motor driver circuit further electrically isolated from the windings of the motor for performing a diagnostic on a motor damping network;
- a resonant network based on the windings of the motor, the damping network, and a remaining non-isolated portion of said controller;
- an amplifier circuit for applying an excitation signal to said resonant network;
- a detector circuit for detecting a response of said resonant network based on said excitation signal; and
- wherein a state of the damping network is determined based on said response.

18. A system for diagnosing motor damping network integrity, the motor damping network configured for selective short-circuiting of the windings of a motor in a motor control system, the system comprising:
- means for electrically isolating a motor drive portion of a motor controller from the windings of the motor;
- means for configuring the windings of the motor, the damping network, and a remaining non-isolated portion of said controller as a resonant network;
- means for applying an excitation signal to said resonant network;
- means for detecting a response of said resonant network based on said excitation signal; and
- means for determining a state of the damping network based on said detecting.

* * * * *